Jan. 30, 1951     W. PIEPER     2,539,700
ADJUSTABLE DRAFTING TABLE WITH BRAKE MECHANISM
Filed Jan. 15, 1948
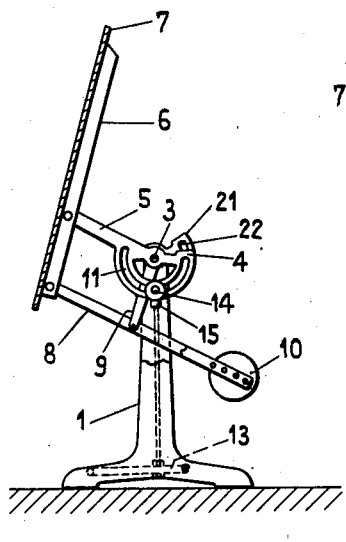
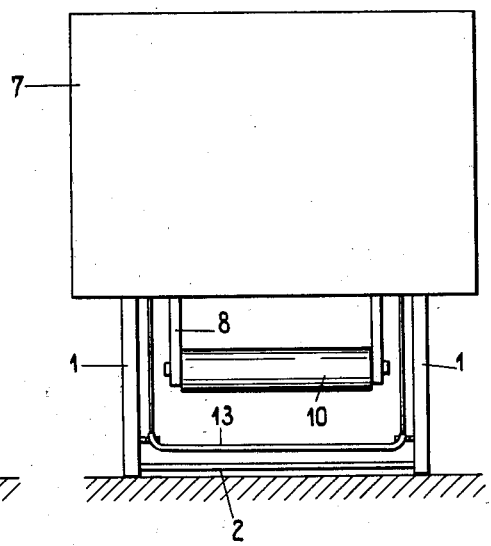
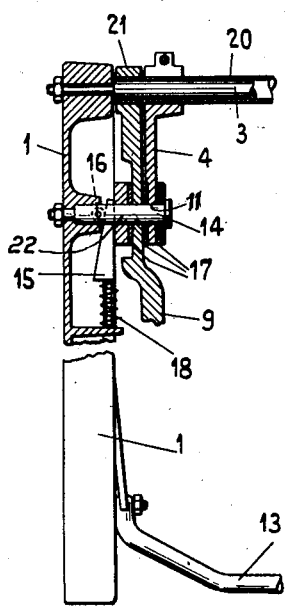
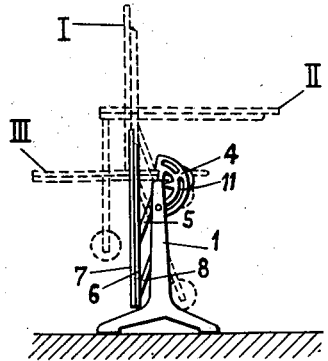
Inventor
Willi Pieper,
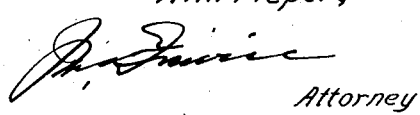
Attorney Patented Jan. 30, 1951

2,539,700

UNITED STATES PATENT OFFICE 2,539,700

ADJUSTABLE DRAFTING TABLE WITH BRAKE MECHANISM

Willi Pieper, Zurich, Switzerland

Application January 15, 1948, Serial No. 2,470
In Switzerland August 1, 1947

3 Claims. (Cl. 311—36)

The invention relates to a drafting stand which has at least its feet and guide segments made of light metal. These parts can be cast economically and advantageously in cast-iron moulds; the manufacture of the whole drafting stand requires little time. The invention further consists in an improved brake mechanism which makes possible a multiple setting of the drawing board.

One embodiment of the object of the invention is illustrated by way of example in the accompanying drawing, in which:

Fig. 1 shows a side view and

Fig. 2 a front view of the drafting stand,

Fig. 3 the brake mechanism,

Fig. 4 the drafting stand with different settings of the drawing board.

The drafting stand or table comprises a base which has two spaced side uprights, legs or pedestals 1 provided with feet for firm support on the floor, firmly connected together below by rods 2, and above by a rod 3. The uprights 1 and feet thereof are made of light metal and they may be advantageously cast in moulds. On the rod 3 a hollow shaft 20 is rotatably supported, with a segment 4 fixed near each of its ends. Each segment 4 is connected to an arm 5, each of which is jointed to a rail 6 fixed on the back of the drawing board 7. To each rail 6, and parallel to the arm 5, a bar 8 is pivotably connected, each bar 8 being fixed at its free end to one common counterweight 10. Each bar 8 is pivotably connected to an arm 9 which extends from a segment 21 which is journalled on the shaft 20 adjacent the respective segment 4. The segments 4 and 21 are of the same dimensions and have arc-shaped slots, 11 and 22 respectively, through which projects a bolt 14 which is fixed to the adjacent upright or support 1. Friction discs 17 are mounted between the segments 4 and 21 between segments 4' and the heads of bolts 14 and between segments 21 and washers on the bolts adjacent the uprights 1. Furthermore, each bolt 14 is provided with a wedge or tapered key 15 which lies between a roller 16 in the bolt 14 and the washers between keys 15 and friction discs 17 to form an anti-friction bearing surface for each of said wedges in opposition to the brake means thus provided. Both keys 15 may be moved simultaneously against the force of expansion or tension springs 18 by means of one common pedal 13 connected to the key stems or shanks as shown. The springs 18 are mounted on said key stems or shanks between the keys and webs of the frame uprights 1 and tend to close the friction brake 4, 21, 17, 14. The drawing board 7 may be set for instance in any of the positions indicated by broken lines I, II, III in Fig. 4. The pedal 13 is provided for adjusting as follows: When pressure is exerted on the pedal, the brakes at both sides are released by drawing keys or wedges 15 down, but they are returned automatically by the springs 18 into the clamping position when the pedal 13 is freed.

Instead of as drawn, the segments could have the segments with the arc-shaped slots directed upwards, or the relative mutual positions of the pairs segments could be interchanged.

What I claim is:

1. A drafting stand comprising a base including two spaced uprights, a shaft extending between and journalled at the upper ends to said uprights, a segment fixed on each end of said shaft and having an arm extending substantially radially therefrom, a drafting board pivotally mounted at its ends on said arms respectively, a second segment journalled on each end of said shaft and having an arm extending substantially radially therefrom, a bar pivotally connected at one end to each end of said drafting board and pivotally connected intermediate its length to the respective arm of said second segments, a counter weight extending between the opposite ends of said bars, coinciding arcuate slots in each of said segments, a bolt extending through the slots of the two adjacent segments at each end and fixed in the adjacent upright of said base, and brake means carried by said bolts and interposed on each side of and between said adjacent segments, and means for releasably clamping said brake means and segments together.

2. A drafting stand as defined in claim 1 wherein said brake applying means comprises a wedge slidably positioned between each of said brake means and the adjacent upright of said base, a pull rod connected to each wedge, a foot lever journalled to each end of said base and connected to said pull rods for withdrawing said wedges, and a spring coiled around each pull rod and biasing said wedge into brake operating position.

3. A drafting stand as defined in claim 2 wherein a roller is carried by each of said bolts to form an anti-friction bearing surface for each of said wedges in opposition to said brake means.

WILLI PIEPER.

REFERENCES CITED

The following references are of record in the file of this patent:

UNITED STATES PATENTS

| Number | Name | Date |
|---|---|---|
| 1,373,473 | Weydell | Apr. 5, 1921 |
| 1,845,868 | Eriksen | Feb. 16, 1932 |
| 1,847,398 | Hurych | Mar. 1, 1932 |
| 1,859,456 | Nestler | May 24, 1932 |
| 2,452,216 | Yarber | Oct. 26, 1948 |

FOREIGN PATENTS

| Number | Country | Date |
|---|---|---|
| 179,123 | Switzerland | Nov. 1, 1935 |
| 465,576 | Great Britain | May 10, 1937 |